3,172,816
METHOD OF INCREASING THE OIL SOLUBILITY OF COMPOUNDS AND PRODUCTS THEREOF
Joseph V. Swintosky, Perkiomenville, Pa., assignor to Smith Kline & French Laboratories, Philadelphia, Pa., a corporation of Pennsylvania
No Drawing. Filed Jan. 28, 1963, Ser. No. 254,491
6 Claims. (Cl. 167—82)

This invention relates to a method of increasing the oil solubility of compounds and the products of the method. More specifically this invention relates to increasing the solubility of a proton acceptor organic compound in oil and correspondingly to the increase in the partition coefficient of such a compound in an emulsion to provide a higher than normal percentage of the compound in the oil phase. Thus, the invention is intended to embrace oil solutions of proton acceptor organic compounds and emulsions thereof.

The term "proton acceptor organic compounds" as used herein is used to mean compounds containing functional groups with an unshared electron pair, i.e., compounds which exhibit coordinate co-valence, such as is displayed in amines.

The method and products of this invention have widespread utility, for example in the preparation of oil solutions and emulsions of insecticides, fungicides and weed killers. They find particular utility in the pharmaceutical field which will be stressed hereinafter.

Prior to the present invention one of the major disadvantages of oil/water emulsions and other oral fluid dosage forms containing proton acceptor organic compounds has been the unpleasant taste associated with them due to the bitterness or sting caused by the portion of proton acceptor medicament solubilized in the aqueous phase.

Still another disadvantage in the case of relatively water insoluble proton acceptor medicaments has been the inability to solubilize in oil a high content of the proton acceptor medicament in order to produce a high dosage of the medicament in the oil phase of an emulsion.

A still further major disadvantage of pharmaceutical emulsions and oil solutions containing proton acceptor organic compounds of the prior art is that it has been difficult in the past to prepare such a liquid preparation having sustained release characteristics.

A disadvantage of emulsions containing proton acceptor organic compounds prepared according to the prior art is that these preparations have very unstable chemical and physical systems.

It has been found that by using certain acidic additives it is possible to increase markedly the solubility of a proton acceptor organic compound in oil. In the case of emulsions, the addition of the acidic additive results in an increase in the partition of the proton acceptor organic compound to the oil phase, i.e., the medicament shows markedly increased preference for the oil phase of the emulsion.

In the pharmaceutical field, this phenomena leads to the formation of pharmaceutical emulsions containing proton acceptor organic compound drugs which are virtually tasteless, a long sought after objective in the pharmaceutical field. Due to the increased concentration of the proton acceptor organic compound drug in the oil phase, there is a reduced concentration in the aqueous phase of the vehicle and hence improved taste. In most cases the resulting taste is wholly unobjectionable. Further, such emulsions are far more stable than the prior art counterparts.

The method of this invention comprises adding an oil soluble organic carboxylic acid to an oil solution or an oil/water emulsion which contains or will contain one or more proton acceptor organic compounds. Preferably the oil soluble acid is dissolved in the oil and the organic proton acceptor is then added to the oil. In forming an emulsion, water is preferably added to the oil solution containing the acid and the proton acceptor and the oil/water mixture is thoroughly agitated. It will be appreciated, that if desired, in order to facilitate forming of the emulsion, emulsifying agents may be added. It will also be appreciated that the order of addition of the compounds to the oil solution is not critical and may be varied, for example, the proton acceptor may be added first and the acid later and other conditions such as heating the oil, if necessary, may be applied to these preparations.

When forming an oil/water emulsion, the pH of the aqueous phase should be chosen to allow formation of some undisassociated organic proton acceptor, yet be such a pH value that the acidic additive's solubility in the aqueous phase is less than 1% at 25° C. A low pH normally causes the carboxylic acid additive to be present in almost complete entirety in the oil phase where it is desired, whereas a high pH creates the conditions for soap formation and transfer of the additive to the aqueous phase where it is not desired. A low pH normally causes proton acceptor compounds such as amines to dissolve in the aqueous phase usually as a result of soluble salt formation. For the purposes of this invention such a low pH is undesirable. A high pH causes more of the proton acceptor compound found in the aqueous phase to be in the unprotonated form which for the purposes of this invention is desirable in order to facilitate transfer of proton acceptor compound to the oil phase. It is then seen that a pH which is most favorable for retention of organic acid additive in the oil phase is least favorable for retention of proton acceptor compound in this same oil phase. An intermediate pH which is a compromise of that pH most favorable for the additive or the pH most favorable for the proton acceptor compound alone and which is such that the solubility of acidic additive in water water at 25° C. is less than 1% is satisfactory for enhancing transfer of the proton acceptor compound to the oil phase. The pH most useful for this purpose differs for different proton acceptor compounds and for the different organic acid additives which may be employed; however the pH range generally found useful has been between pH 4 and 11. Advantageosuly a pH of between 5 and 9 is employed.

This pH range is controlled by use of buffering solutions well-known to the art. In general the buffer solution is prepared by usig a solution of acids and salts or alkali and salts. Exemplary of the salts which can be used in the buffering solutions are acetates, citrates, phosphates, phthalates, borates and bicarbonates. Examples of buffering solutions comprising weak acids and salts would be boric acid and sodium borate, citric acid and sodium citrate, citric acid and sodium biphosphate. Exemplary of buffering solutions with either strong acids or bases and salts would be for example, potassium acid phthalate and hydrochloric acid mixtures and potassium acid phthalate and sodium hydroxide mixtures.

The increasing of the oil solubility of the proton acceptor organic compound results apparently from interaction of the acidic additive and the proton acceptor compound. In emulsions this results in transfer of the proton acceptor compound to the oil phase.

In accordance with this invention the organic carboxylic acid may be any oil soluble aliphatic or aromatic carboxylic acid having in excess of 5 and preferably not over about 22 carbon atoms. In the case of an oil/water emulsion the aliphatic or aromatic carboxylic acid will have a solubility of less than 1% in water at about 25° C. at the selected pH for the preparation. Exemplary of the aliphatic organic acids are caproic, caprylic, pelargonic, capric, undecylenic, lauric, myristic, palmitic, stearic, oleic, linoleic, linolenic and behenic. Exemplary of the aromatic carboxylic acids are, for example, benzoic, salicylic, bismethylene salicylic, cinnamic, pamoic or phthalic acids. For pharmaceutical use the acid will be a nontoxic, pharmaceutically acceptable compound of which the above are exemplary.

This invention is applicable to proton acceptor organic compounds. Most advantageously this invention is applicable to proton acceptor organic amines. The invention is of particular advantage when employing amino containing medicaments. Exemplary of amino medicaments are sympathomimetic amines such as, for example, amphetamine, dextroamphetamine, racemic amphetamine, ephredine, epinephrine, isoproterenol, phenylephrine, propylhexedrine, phenylpropanolamine or atropine; tranquilizers such as, for example, chlorpromazine, prochlorperazine or trifluoperazine; antibiotic agents such as, for example, tetracycline, streptomycin, neomycin; and antihistaminic agents such as, for example, chlorprophenpyridamine, pyrithiamine, pheniramine and chlorpheniramine.

When a pharmaceutical preparation is involved oils, such as, for example, fixed oils and heavy mineral oil may be used. Exemplary of fixed oils would be for example, almond oil, castor oil, coconut oil, cod liver oil, cottonseed oil, glyceryl trioleate, linseed oil, olive oil, palm oil, palm kernel oil, peanut oil and persic oil. Solid fixed oils or fats in a melted state such as, for example, glyceryl monostearate, glyceryl distearate, glyceryl tristearate and glyceryl tripalmitate may also be employed. When applicable for insecticides petroleum fractions such as light liquid petrolatum and kerosene oils would be preferable. Various other insoluble oils in which the acidic additive compounds are soluble may be used such as, for example, higher molecular weight liquid alcohols, ethers and esters.

The molar ratio of acidic additive to the proton acceptor compound is from about 0.5 to 1 to about 100 to 1, the advantageous range of acidic additive to proton acceptor compound being from about 1 to 1 to about 20 to 1.

The emulsifying agent which may be used to form the basic oil/water emulsion may be any known nontoxic surface agent not reactive with the other ingredients of these compositions. Preferably a nonionic agent is employed. By way of example of anionic surface active agents are sulfonic acids and the salts or sulfonated esters such as sodium lauryl sulfate, sodium sulfoethyl oleate, dioctyl sodium sulfosuccinate, cetyl sulfate sodium or myristyl sulfate sodium. By way of example nonionic surface active agents, are glycol monolaurate, polyoxyethylene stearate, polyoxyethylene sorbitan monooleate, polyoxyethylene sorbitan monolaurate, sorbitan monooleate or sorbitan monolaurate. Gums such as, for example, acacia and other well-known emulsifying agents such as lecithin may also be used. All of the above emulsifying agents are nontoxic and hence applicable for pharmaceutical preparations.

The product of the thus outlined process comprises an oil solution or an aqueous oil emulsion containing a proton acceptor organic compound and an oil soluble organic carboxylic acid having in excess of 5 carbon atoms and preferably not more than 22 carbon atoms, the proton acceptor organic compound being present in the oil in a substantially larger amount than is the case when the acid is not present.

It has also been unexpectedly discovered that pharmaceutical preparations obtained as a result of the method of this invention continuously maintain a desired therapeutic level of a selected medicament over an extended period of time, for example, as long as ten to twelve hours.

The following examples are not limiting but rather are illustrative of the method and product of this invention. Variations of this reaction will be obvious to one skilled in the art.

*Example 1*

Ingredients: Amounts, gms.
  Ephedrine alkaloid _____ 0.5
  Oleic acid _____ 8.0
  Sodium lauryl sulfate _____ 0.1
  Peanut oil _____ 20.0
  Distilled water, q.s. _____ 100.0

The ephedrine alkaloid and oleic acid are mixed in the peanut oil. The sodium lauryl sulfate is then dissolved in the water and the oil phase is then added to the aqueous phase with rapid agitation. The pH of the resultant product is 8.0.

*Example 2*

Ingredients: Amounts, gms.
  Chlorpromazine _____ 2.5
  Cottonseed oil, q.s. _____ 100.0
  Lauric acid _____ 1.0

The chlorpromazine and lauric acid are dissolved in the cottonseed oil. The oil solution is filtered through a cellulose membrane and then aseptically filled into 2 ml. ampuls.

*Example 3*

Ingredients: Amounts, gms.
  Phenylpropanolamine _____ 1.0
  Linoleic acid _____ 10.0
  Polyoxyethylene sorbitan monooleate __ 0.2
  Coconut oil _____ 35.0
  Distilled water _____ 100.0

The phenylpropanolamine and linoleic acid are mixed in the coconut oil. The polyoxyethylene sorbitan monooleate is then dissolved in the water and the oil and water phases are mixed with rapid agitation.

What is claimed is:

1. A method for increasing the solubility of a proton acceptor organic amino medicament in oil which comprises dissolving an oil soluble organic carboxylic acid having from about 5 to about 22 carbon atoms and said proton acceptor in said oil.

2. The method for increasing the solubility of a proton acceptor organic amino medicament in oil which comprises dissolving a pharmaceutically acceptable nontoxic oil soluble organic carboxylic acid having from about 5 to about 22 carbon atoms and the proton acceptor medicament in said oil.

3. An oil solution containing a proton acceptor organic amino medicament comprising oil, a proton acceptor organic amino medicament and an oil soluble organic carboxylic acid having from about 5 to about 22 carbon atoms, said proton acceptor organic amino medicament being present in the oil in an amount greater than its solubility in the oil without the presence of said acid.

4. An oil solution containing a proton acceptor organic amino medicament comprising oil, a proton acceptor organic amino medicament and a pharmaceutically acceptable nontoxic oil soluble organic carboxylic acid having from about 5 to about 22 carbon atoms, said proton acceptor medicament being present in the oil in an amount greater than its solubility in the oil without the presence of said acid.

5. An aqueous/oil emulsion containing a high concentration of a proton acceptor organic amino medicament in the oil phase comprising, oil, water, a proton acceptor organic amino medicament and an oil soluble organic carboxylic acid having from about 5 to about 22 carbon atoms and being less than 1% soluble in water at about 25° C.

6. An aqueous/oil emulsion containing a high concentration of a proton acceptor organic amino medicament in the oil phase, comprising oil, water, a proton acceptor organic amino medicament and a pharmaceutically acceptable nontoxic oil soluble organic carboxylic acid having from about 5 to about 22 carbon atoms and having a solubility in water of less than 1% at about 25° C.

References Cited in the file of this patent

UNITED STATES PATENTS

| | | |
|---|---|---|
| 2,089,212 | Kritchevsky | Aug. 10, 1937 |
| 2,661,315 | Jurist et al. | Dec. 1, 1953 |
| 2,953,496 | Phillips | Sept. 20, 1960 |
| 2,988,484 | Barsky et al. | June 13, 1961 |
| 3,028,307 | Ninger | Apr. 3, 1962 |
| 3,055,923 | Ginger et al. | Sept. 25, 1962 |
| 3,067,104 | Hochberg et al. | Dec. 4, 1962 |
| 3,070,499 | Mullins et al. | Dec. 25, 1962 |
| 3,077,438 | Fand et al. | Feb. 12, 1963 |
| 3,096,249 | Prigal | July 2, 1963 |

OTHER REFERENCES

Manufacturing Chemist, March 1956, pp. 89-91.